Feb. 10, 1970 T. C. BOHRER 3,494,121
HOLLOW REINFORCED COMPOSITE FIBER AND
PROCESS FOR PRODUCING SAME
Filed June 30, 1967
FIG.1
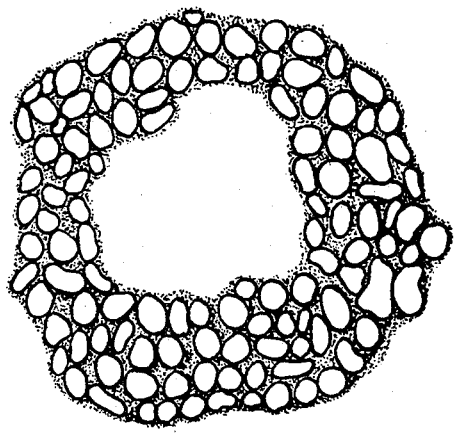
FIG.2
FIG.3
INVENTOR.
Thomas C. Bohrer
BY C. B. Barrin
ATTORNEY _United States Patent Office_

3,494,121
Patented Feb. 10, 1970

3,494,121
HOLLOW REINFORCED COMPOSITE FIBER AND PROCESS FOR PRODUCING SAME
Thomas C. Bohrer, Madison, N.J., assignor to Celanese Corporation, New York, N.Y., a corporation of Delaware
Filed June 30, 1967, Ser. No. 650,469
Int. Cl. D02g 3/02, 3/36; D01f
U.S. Cl. 57—157
16 Claims

ABSTRACT OF THE DISCLOSURE

The invention relates to a process for the production of a hollow filament by contacting a plurality, e.g., 2–500, of filaments with a solution comprised of a polymer of an organic solvent so as to form a unitary filamentary structure and heating the resulting unitary filament at a temperature above the volatilization point of said solvent and below the point where foaming occurs. The filaments may be twisted before or after immersion so as to impart about 1 to 10 twists per inch, and so as to form a uniary filamentary structure having an essentially annular cross-section.

---

This invention relates to novel, hollow filaments and to the process for producing same. More particularly, this invention relates to novel, hollow reinforced composite filaments and to the process of producing same by passing a multifilament yarn through a polymer solution and subsequently passing the resulting composite into a heated zone which is maintained above the point of significant vapor pressure of the solvent but below the point where foaming occurs.

Hollow filaments present maximum potential as extremely important and useful materials in industry in a wide variety of applications. For example, hollow filaments exhibit specific utility as a membrane in membrane separation processes and, more broadly, for use as a textile component.

Potential advantage of a hollow filament as a membrane resides in its inherent strength and high pressure capability. Thus, even a thin-walled hollow filament eliminates the need for expensive supporting and holding apparatus which is now required for flat membranes. Further, the high surface-to-volume ratio, as compared with planar membranes, lowers the overall size of a separation apparatus. The possibilities for end use application are quite varied and by way of example include substitution of body processes such as for artificial kidneys and lungs; food industry such as in the purification of sugar beets; the battery industry, especially in new designs requiring permeable walls; and, water purification, both in sewerage treatment and desalination.

As mentioned, potential utility of a hollow filament also includes possible textile end uses. These end uses would be predicated on the properties of high bulk; good hiding power, high bulk to weight ratios; excellent insulating properties; buoyancy; improved resiliency; improved acoustical properties; modified luminosity; and, modified dyeing characteristics. The foregoing properties make hollow filaments excellent candidates for various end uses which include by way of example: buoyant sailing and fishing apparatus such as sails, tow ropes and lines; buoyant clothing; acoustical insulation or "thermal" clothing.

The known methods for producing hollow filaments generally fall into two broad categories, i.e., mechanical methods and physical and chemical gas formation methods. With regard to the mechanical methods, generally these pertain to modifications to the spinneret used to produce the filaments. These methods generally involve either a variation of sheath and core apparatus in which gas, usually air, is bled into the core at a very slight positive pressure or involve complex shaped spinneret holes which rely upon the edges of the filament overlapping and sealing upon themselves thus producing a tubular filament. Apparently, the above methods involve costly apparatus which is difficult to assemble and operate.

With regard to the physical and chemical gas formation, a variety of means are known of producing a hollow core from gas formation which is either continuous or intermittent. Such methods involve the use of polymer solutions in which the gas producing phenomena is caused by release from solution of dissolved gases or produced by gas forming chemicals dissolved in a polymer solution.

The present invention provides novel, hollow reinforced composite filaments as well as a process for producing same. The present invention is particularly advantageous inasmuch as it avoids the usual requirement for complex jet assemblies in making such hollow filaments and, more specifically, inasmuch as it is applicable to solution spun materials where fabrication of such jet assemblies is particularly onerous because of small jet hole sizes.

In accordance with the present invention, desirable hollow reinforced composite filaments are produced by passing a multifilament yarn through a polymer solution in order to produce a unitary filamentary structure. The polymer solution may be comprised of a polymer similar to that from which the filaments are formed or it may be comprised of a different polymer. Obviously, the polymer solution and reinforcing fibers chosen depend upon the properties desired and end use application. For example, glass fibers would be preferably employed to produce the highest flexibility and tensile strength but low elongation. After passage through the polymer solution, excess solvent is removed and the thus-formed composite unitary structure is passed, in the case of volatile solvents, into a heated zone which is maintained at a temperature which is above the point required to significantly volatilize the solvent used in said polymer solution but which is maintained at a temperature below the point where uncontrollable volatilization or foaming within the structure occurs.

In the case of wet spinning, the conditions of spin bath temperature, composition, polymer solution temperature, etc. may be controlled to produce a high driving force of the bath into the center of the fiber and thereby produce a hollow wet spun filament. The same situation applies to the hollow reinforced fiber structure.

Broadly, the present invention is directed to filamentary structures which are soluble in one or more solvents. More specifically, the invention is concerned with filamentary structures which are prepared by dry-spinning or wet-spinning procedures in which a polymer solution is extruded through spinnerets to form filaments therefrom by the elimination of the solvent from the extruded material by evaporation or into a coagulating liquid into which the solvent diffuses respectively. Typical examples of such conventional processes include the preparation of rayon filaments by extruding viscose; cellulose acetate compositions, such as secondary cellulose acetate, cellulose triacetate, cellulose tripropionate, cellulose acetate butyrate and mixtures of cellulosic esters with other polymers; acrylics, such as acrylonitrile homopolymers and copolymers of acrylonitrile with methyl methacrylate, vinyl acetate, vinyl pyridene, and the like. It is to be understood that the above polymers and mixtures thereof are by way of example and do not limit the intent or scope of the present invention.

It is also to be understood that choice of solvent for the fiber-forming materials as well as conditions and techniques utilized in spinning solution preparation, spinning per se, etc. involve conventional practices and, consequently, do not constitute a portion of the present invention.

The present invention is, however, in one embodiment specifically directed to the preparation of hollow fibers from high temperature polymers such as polybenzimidazoles, poly bis benzimidazo-benzophenanthroline polymers and the like.

BRIEF DESCRIPTION OF THE DRAWINGS

FIGURE 1 is an annular cross section of a hollow reinforced composite fiber produced in accordance with the present invention, FIGURE 2 is a portion of the annular cross section shown in FIGURE 1 but enlarged by a factor of two, FIGURE 3 represents a segment of a hollow reinforced composite fiber with a portion of the polymer matrix removed from the reinforcing fibers.

DESCRIPTION OF THE PREFERRED EMBODIMENTS

Polybenzimidazoles are a known class of heterocyclic polymers. Their preparation and description are disclosed, for example, in Patent Nos. 2,895,948 and 3,174,947. A particularly interesting subclass of polybenzimidazoles for fiber production consists of recurring units of the formula:

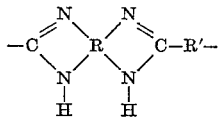

wherein R is a symmetrically tetravalent aromatic nucleus, the adjacent carbon atoms of which paid with nitrogen atoms from a corresponding tetra-nitrogen monomer, e.g., tetra-amine, to form the benzimidazole rings, and R′ is a carbocyclic, aromatic or alicyclic ring, an alkylene group or a heterocyclic ring. Examples of such heterocyclic rings include those of pyridine, pyrazine, furan, quinoline, thiophene and pyran. Preferred R groups are diphenyl with free valences at the 3,3′,4, and 4′ positions, i.e.,

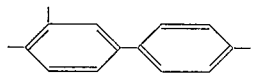

benzene with free valences at the 1,2,4 and 5 positions, i.e.,

 and 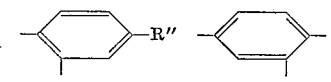

wherein R″ is

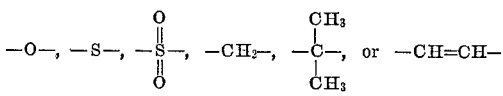

Examples of such polybenzimidazoles include poly-2,2′(m-phenylene) 5,5′-bibenzimidazole, poly - 2,2′-(pyridylene-3″,5″)-5,5′-bibenzimidazole; poly-2,2′-furylene-2″,5″)-5,5′-bibenzimidazole; poly-2,2′ - (napthalene-1″, 6″)-5,5′-bibenzimidazole; poly - 2,2′ - (biphenyline 4″, 4‴)-5,5′-bibenzimidazole; poly-2,2′ - amylene-5,5′-bibenzimidazoel, poly-2,2′-octamethylene - 5,5′-bibenzimidazole, poly-2,6-(m-phenylene)-diimidazobenzene; poly-2,2′- cyclohexenyl-5,5′-bibenzimidazole; poly-2,2′(m-phenylene)-5,5′-di(benzimidazole)ether; poly-2,2′ - (m-phenylene)-5,5′-di(benzimidazole) sulfide; poly - 2,2′(m-phenylene)-5,5′-di(benzimidazole) sulfone; poly - 2,2′,2″(m-phenylene)-5′,5″-di(benzimidazole) propane-2,2 and poly-2′,2″ (m-phenylene)-5′,5″ - di(benzimidazole) ethylene - 1,2 where the duoble bonds of the ethylene groups are intact in the final polymer.

As set forth in U.S. Patent No. 3,174,947, the preferred high molecular weight polybenzimidazoles are prepared by reacting a member of the class consisting of (A) an aromatic compound containing ortho disposed substituents and an aromatic carboxylate ester substituent and (B) a mixture of (1) an aromatic compound containing a pair of ortho-diamino substituents on the aromatic nucleus and (2) a member of the class consisting of (a) the diphenyl ester of an aromatic dicarboxylic and, (b) the diphenyl ester of a heterocyclic dicarboxylic acid wherein the carboxyl groups are substituents upon carbon in a ring compound from the class consisting of pyridine, pyrazine, furan and quinoline and and (c) an anhydride of an aromatic dicarboxylic acid. It should be noted that the "aromatic compound" mentioned in the foregoing description of (A) and (B) may contain a single aromatic ring structure of a plurality of such ring structures, e.g., two such structures separated by an ether, sulfide, sulfone, alkylidene or alkenylene group to yield the foregoing polymer structures.

As described in U.S. Patent No. 3,174,947 and in Vogel et al, J. Polymer Science, volume 50, pp. 511–539 (1961), the foregoing polybenzimidazoles may be prepared by means of a two-stage process. The monomers are charged to a reactor and heated from 200 to 300° C. under a pressure of less than 0.5 mm. Hg. The foaming melt polymerized product is then cooled, finely powdered and recharged to a reactor, followed by heating at a temperature of at least 250° C. and a pressure of less than 0.7 mm. whereby the final solid state condensation occurs. This process may be modified by replacing the vacuum conditions by a flow of substantially oxygen-free nitrogen through the reactor at atmospheric pressure.

As mentioned, the foregoing polybenzimidazoles are usually formed into filaments and films by dry or wet extruding a solution of the polymer in an appropriate solvent such as dimethyl acetamide, dimethyl formamide or dimethyl sulfoxide, or wet spinning from sulfuric acid through an opening of a predetermined shape into an evaporative atmosphere for the solvent in which most of it is evaporated, or into a coagulation bath, resulting in the polymer having the desired shape. In the case of filaments, this is called "dry spinning" or "wet spinning" respectively.

After spinning, the precursor filaments are drawn in order to render them insoluble in the dope preparation through which they are subsequently passed and, in addition, improve their physical characteristics, e.g., tenacity, elongation, etc. Generally, draw ratios of from 1.1 to 8 to 1 are employed. Preferably the filaments are subjected to a temperature between about 250° and 650° C. for about 5 to 20 seconds prior to a hot drawing accomplished at 450° to 600° C. at draw ratios of from about 2 to 6.

In accordance with the invention a plurality of precursor filaments of suitable material, e.g., from 2 to 500 or more, preferably from about 25 to 75, monofilaments are employed to fabricate the final filament. The filaments may be untwisted or contain twist either real or false. This multifilament supply is contacted with a polymer solution, preferably a solution similar to that employed to form the precursor material, e.g., a solution containing from about 10 to 40% i.e., 10 to 40 parts, of polymer based on the total weight of solution including additive. It has been found that the solution employed to contact the filaments may be more dilute than the spinning solution, e.g., as little as about 5% i.e., 5 parts of polymer may be employed in some instances.

For example, in the case of polybenzimidazole, the solution may comprise 5 to 30 parts of polybenzimidazole and from 95 to 70 parts of organic solvent.

The polymer solution may be applied by a variety of methods, e.g., by passing the filaments through a reservoir of solution, by spraying the solution, etc. Enough solution is applied so as to provide a unitary structure, i.e., bond the multifilament precursor material into a single filament. Excess polymer solution is removed by means of an absorbent material, e.g., a sponge or any other material which serves as a wick, or by squeeze rolls, etc.

After contact with the polymer solution and subsequent removal of excess solution the resulting high denier filament if untwisted multifilament yarn was used, may be subjected to a twisting action and an additional contacting with polymer solution or if twisted multifilament yarn was used, may be subjected to additional contacting directly. It is desirable to impart from about 1 to 10, preferably from about 4 to 6, twists per inch into the once coated, e.g., intermediate high denier filament. It is found that this twisting and post-coating technique results in a more rigid product having an essentially round cross-section, a phenomena otherwise difficult to obtain. Other advantages of twisting in the hollow filament case involves alignment of the fibers around the core to produce a radial reinforcement. The twist may be imparted by a variety of conventional techniques. For example, the intermediate yarn can be twisted and placed on a bobbin. The twisted yarn is then unwound and passed through polymer solution in the hereinbefore manner. It is also contemplated to false twist the yarn, i.e., by means of an air jet or tangential roll which imparts twist in opposite directions on either side of the center of application. If the yarn is then fused in the twisted (false) position by immersion in the twisted position, then desired substantially round cross-section and radial looping of reinforcing fibers results after subsequent untwisting. It is to be understood that this post-coating technique, i.e, second coating, need not be limited to a single contacting with polymer solution, but may be a multiple coating, e.g., 2, 3 or more coats of solution being applied. In each instance excess polymer solution is removed and the coating applied is preferably dried prior to the subsubsequent step.

The high denier filament is then passed through a heated zone which is maintained at a temperature above that required for significant volatilization of the solvent, but below the point where foaming occurs in the case by dry spinning, and through a bath which coagulates the polymer solution quickly thereby driving bath to the center and producing a hollow fiber in the case of wet spinning. Such step may be accomplished in any conventional manner. A preferred technique is by passing the filament through a muffle furnace in the case of dry spinning which in the instance of benzimidazole polymers and the like, is maintained at a temperature of from about 50° C. to 500° C., preferably 150 to 400° C., for a residence time of about 1 to 100 seconds, preferably 5 to 20. It is important that the temperature in the case of dry spinning, and retention time be controlled very carefully. If the temperature is too high, or the retention too long, foaming occurs. This could be a uniform foam structure or it could result in producing a plurality of parallel cores instead of a single core. If, on the other hand, retention and/or temperature are too low, no hollow fiber is produced. The similar condition exists in wet spinning with respect to polymer solution temperature, bath temperature, bath composition, and bath retention.

After the foregoing treatment, the resultant filament may be subjected to one or more conventional treating stages, e.g., washing, to remove residual volatiles, e.g., solvents, drawing, rewashing, annealing, etc. prior to final disposal, e.g., immediate use, winding for storage, etc.

In accordance with the invention, the coating surrounding the hollow matrix of precursor monofils is preferably treated so as to improve its physical properties. For example, in the instance of benzimidazole polymers, an untreated coating is soluble in certain solvents, e.g., sulfuric acid, etc. Further, an untreated coating is subject to high moisture regain which, as a consequence, does not permit high temperature applicability. In order to render the coating insoluble and amenable to high temperatures, i.e., cross-link said coating, the coating is either drawn or heat treated under specified conditions, preferably after removal of volatiles, e.g., by washing. The drawing of the coated hollow product is accomplished at temperatures of from about 400° to 600° C. and higher, e.g., 800° C. at draw ratios of from about 1.1:1 to about 3:1. In addition, it is also contemplated to attain a stable coating by relaxation of same, e.g., up to 50% of the original length of the coated hollow filament. In the instance of the heat treatment, the conditions comprise subjection to temperatures in the range of about 300° to 600° C., preferably 450° to 550° C. for periods of from about 1 second up to about 5 hours, preferably from 10 to 60 seconds. The exact conditions being within the bounds of easy experimentation.

The final product advantageously exhibits the desirable strength of the precursor filaments, e.g., high tensile strength, especially in the instance of dry spun precursor filaments. Typical physical properties are 4–7 g./den. tenacity, 15–35% elongation, 60–160 g./den. initial modulus. Accordingly, the preferred precursor filament is a bundle of 25 to 75 dry spun, rather than wet spun, filaments having a denier of 50 to 500. The process per se also exhibits certain advantages over monofil spinning in that it eliminates certain problems, e.g., fibrilation which seems to be prevalent in highly oriented, high denier monofils.

Any natural or synthetic polymeric material can be empolyed as the reinforcing fiber and can be treated according to the process of this invention to accomplish the desired effect. This includes the linear, crystalline polyesters such as polyethylene terephthalate and poly(cyclohexanedimethylene terephthalate); polyamides such as nylon 6 and nylon 66; poly(acrylonitrile); poly(vinyl chloride); vinylidene chloride copolymers; other poly(acrylics); cellulose acetate; cellulose triacetate; nitrocellulose; viscose rayon; cotton; wool; polyolefins such as polyethylene and polypropylene; linear, crystalline polyurethanes; and inorganic polymers such as glass.

The coating i.e., matrix, applied to the reinforcing fibers may be any natural or polymeric substance which can be solvated, i.e., formed into a dope and applied to the reinforcing fiber as hereinbefore described.

As mentioned, the resulting product finds utility as a membrane or membrane support, etc.

The following examples further illustrate the invention.

EXAMPLE I

In this example 30 parts by weight of 2,2'(m-phenylene)5,5' dibenzimidazole having an inherent viscosity of 0.89 and a plugging value of 0.35 is agitated with 70 parts by weight of a 2% lithium chloride solution in dimethyl acetamide for 15 minutes at 140° C. The polymer solution is extruded through a spinneret 1½ inches in diameter containing 50 holes of 76 microns diameter into a downdraft spinning column containing circulating nitrogen to produce a yarn of 400 total denier, the spinneret face being at a temperature of 130–160° C., the top of the column 120–150° C. the middle of the column 160–200° C. and the bottom of the column 200–250° C. After leaving the spinning column, the yarn is taken up at a speed of 100 meters per minute. The yarn is drawn in steam at atmospheric pressure at a draw ratio of from 1.1 to 1.8:1, washed with water on perforated bobbins and dried after which it has a tenacity of about 1.5 grams per denier and an elongation of about 100%. After washing and drying, further drawing in a tube furnace with multiple passes for increased retention at 520° C. using a draw ratio of 2.1 to 1 results in a yarn having a tenacity of about 5 grams per denier and an elongation of about 23%.

Bobbins containing the thus-spun and drawn yarn are placed in a dry box containing a desiccant, i.e., calcium sulfate, in order to keep the yarn dry during unwinding. This yarn, comprised of 50 filaments, is then passed through a solution comprising 20 parts of the polymer and 80 parts by weight of a 1% lithium chloride solution in dimethyl acetamide at a speed of 10m/min. for a residence time of 0.5 second. Excess polymer solution is wiped off the filament emerging from the solution by means of two sponges through which the filament is passed. After removal of excess solution, the resultant monofilament is passed through a muffle furnace maintained at a temperature of 120° C. for a residence time of 8 seconds. The hollow filament emerging from the furnace is wound on a bobbin for storage prior to further processing. The final properties are 4.2 g./den. tenacity, a 22% elongation, and 70 g./den. initial modulus. The final filament has an essentially annular cross-section as evidenced in FIGURE 1, a reproduction (microphotograph) having an enlargement of 900 times. The structure of the filament product is illustrated more clearly in the representation (also of a microphotograph) as illustrated in FIGURE 2. In this instance, an enlargement of 1800 times is employed to illustrate the reinforcing fibers surrounded by the matrix.

As hereinbefore disclosed, the reinforcing fibers may be twisted prior to or subsequent to submersion into the matrix forming solution. FIGURE 3 represents a segment of filamentary product with a portion of the matrix removed from the reinforcing fibers. The twist imparted to said reinforcing fibers is evident from such representation along with the hollow core present in the final product.

EXAMPLE II

In a manner similar to Example I, reinforcing fibers of fiberglass are passed through a solution of 2,2′(m-phenylene)5,5′ dibenzimidazole as employed in Example I and heated to a temperature of 125° C. in a muffle furnace to produce a hollow filament.

EXAMPLE III

Reinforcing fibers of nylon are pretwisted and are passed through a solution of cellulose triacetate of 90/10 methylene chloride/methanol in a manner similar to Example I. The resulting composite is heated in a muffle furnace with a temperature of about 40° C. to produce a hollow fiber.

Many variants of the process will be apparent to one skilled in the art within the spirit of the present invention.

The embodiments of the invention in which an exclusive property or privilege is claimed are defined as follows:

1. A process for the production of a hollow filament which comprises contacting a plurality of filaments with sufficient solution comprised of a polymer and an organic solvent to form a unitary filamentary structure and heating the resulting unitary filament at a temperature above the volatilization point of said solvent and below the point where foaming occurs.

2. The process of claim 1 wherein the resultant filament is dried in an oven at a temperature of 50 to 500° C.

3. The process of claim 1 wherein the coating is cross-linked by drawing same at a temperature between 400° and 600° C. at draw ratios of from about 1.1:1 to 3.1.

4. The process of claim 1 wherein the coating is cross-linked by heating same at a temperature of from about 300° to 600° C. for a period of from 1 second to about 5 hours.

5. The process of claim 1 wherein the unitary filament is twisted so as to impart about 1 to 10 twists per inch, and contacted with a solution comprising a polymer and an organic solvent so as to form a unitary filamentary structure having an essentially annular cross-section.

6. The process of claim 5 wherein the resulting hollow filament is dried in an oven at a temperature of 50 to 500° C.

7. The process of claim 5 wherein the coating is cross-linked by drawing same at a temperature between 400° and 600° C. at draw ratios of from about 1.1:1 to 3.1.

8. The process of claim 5 wherein the coating is cross-linked by treating same at a temperature of from about 300° C. to 600° for a period of from 1 second to about 5 hours.

9. The process for production of hollow polybenzimidazole filaments which comprises passing a bundle of dry spun polybenzimidazole filaments comprising from to to about 500 filaments through a solution comprising from about 5 to 40 parts of a polybenzimidazole similar to the polymer from which said filaments are formed and from about 95 to 60 parts of an organic solvent for said polybenzimidazoles, removing excess polymer solution from the filament emerging from said polymer solution reservoir to form a unitary polybenzimidazole filament and heating the resulting unitary filament at a temperature of from about 150° C. to 400° C.

10. The process of claim 9 wherein said solvent is dimethylacetamide, dimethylformamide or dimethylsulfoxide.

11. The process of claim 9 wherein said resultant filament is dried in an oven at a temperature of 50 to 500° C.

12. The process of claim 11 wherein the unitary filament is subsequently twisted so as to impart about 1 to 10 twists per inch, contacting the thus-twisted filament with a solution comprising 5 to 30 parts of a polybenzimidazole and from 95 to 70 parts of organic solvent and subsequently removing excess polymer solution from the resulting twisted and coated polybenzimidazole filament.

13. The process of claim 12 wherein the coating is cross-linked by drawing same at a temperature between 400° C. and 600° C. at draw ratios of from about 1.1:1 to 3.1.

14. The process of claim 12 wherein the coating is cross-linked by heating same at a temperature of from about 300° to 600° C. for a period of from 1 second to about 5 hours.

15. A hollow polybenzimidazole filament comprised of a plurality of polybenzimidazole monofilaments and a matrix of a dried polybenzimidazole solution.

16. The hollow polybenzimidazole filament of claim 15 wherein said polymer matrix is a cross-linked polymer matrix whereby a solvent resistant and temperature resistant filament coating is provided.

References Cited

UNITED STATES PATENTS

| | | | |
|---|---|---|---|
| 2,959,839 | 11/1960 | Craig | 161—178 |
| 2,965,925 | 12/1960 | Dietzsch | 161—178 XR |

JOHN PETRAKES, Primary Examiner

U.S. Cl. X.R.

57—140, 153, 164; 161—178

PO-1050
(5/69)

UNITED STATES PATENT OFFICE
CERTIFICATE OF CORRECTION

Patent No. 3,494,121        Dated   February 10, 1970

Inventor(s)  Thomas C. Bohrer

It is certified that error appears in the above-identified patent and that said Letters Patent are hereby corrected as shown below:

In column 3 line 34, "paid" should read --pair--; line 64, "imidazoel" should read --imidazole--.

In column 4, line 11, the redundant "and" should be deleted'

In column 5, line 39, "by" should read --of--.

In column 7, line 39, the last "of" should read --in--.

In column 8, claim 8, line 14, insert --C.--. after "600°"; claim 9, line 19, the first "to" should read --two--.

Signed and sealed this 18th day of April 1972.

(SEAL)
Attest:

EDWARD M. FLETCHER, JR.             ROBERT GOTTSCHALK
Attesting Officer                   Commissioner of Patents